Figure 1:
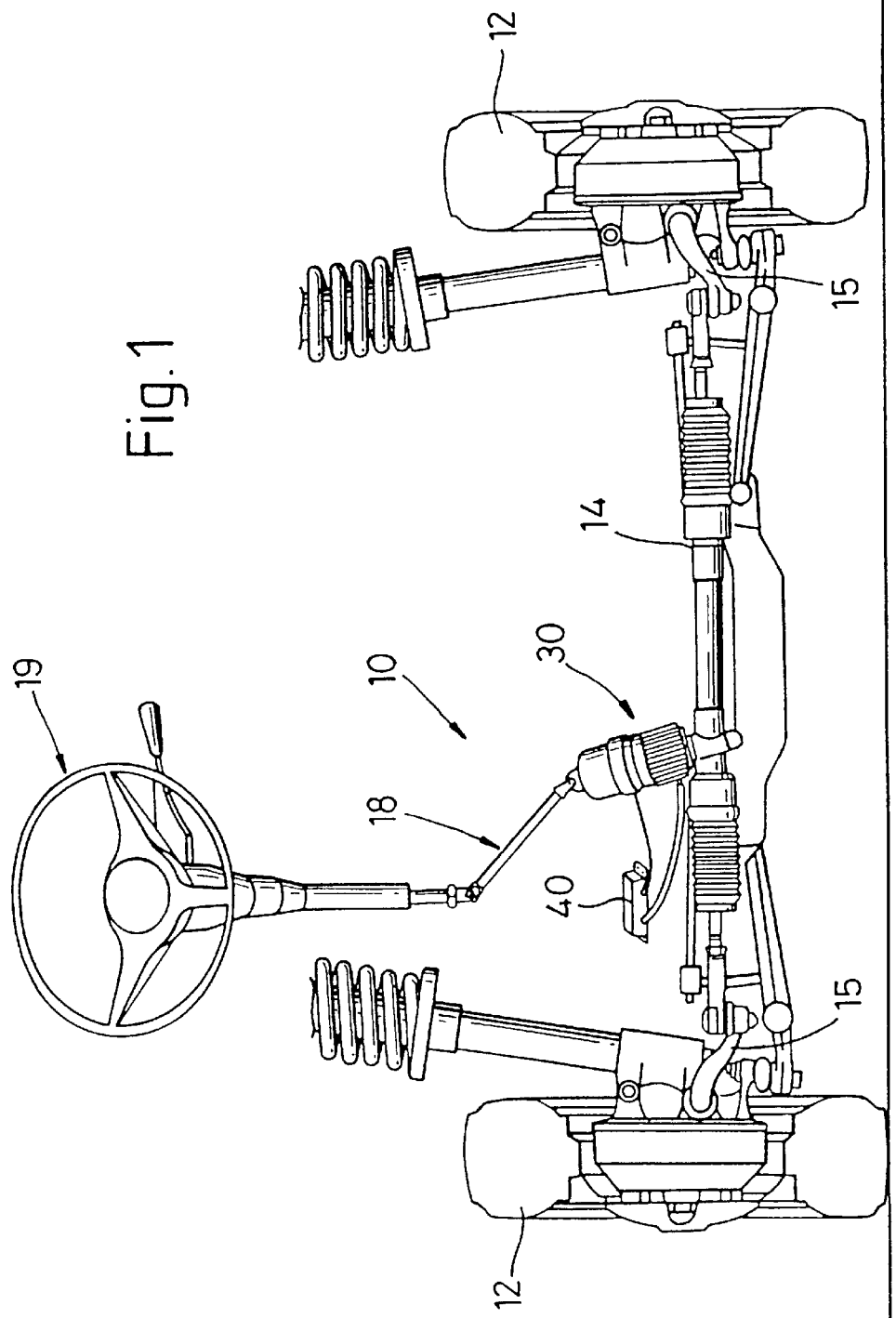

United States Patent [19]
Bailey et al.

[11] Patent Number: 5,810,112
[45] Date of Patent: Sep. 22, 1998

[54] ELECTRICALLY POWERED STEERING MECHANISM

[75] Inventors: David Alexander Bailey, Berkshire; Arthur Thomas Bartram; Stuart James Murden, both of Cambridgeshire, all of England

[73] Assignee: Adwest Engineering Ltd., Reading, United Kingdom

[21] Appl. No.: 612,888

[22] PCT Filed: Sep. 7, 1994

[86] PCT No.: PCT/GB94/01939

§ 371 Date: May 17, 1996

§ 102(e) Date: May 17, 1996

[87] PCT Pub. No.: WO95/07203

PCT Pub. Date: Mar. 16, 1995

[30] Foreign Application Priority Data

Sep. 8, 1993 [GB] United Kingdom ............... 9318639

[51] Int. Cl.[6] ................................................... B62D 5/04

[52] U.S. Cl. .................................................. 180/446

[58] Field of Search .................................. 180/443, 444, 180/446

[56] References Cited

U.S. PATENT DOCUMENTS

| | | | |
|---|---|---|---|
| 4,530,413 | 7/1985 | Buike et al. | 180/79.1 |
| 4,573,545 | 3/1986 | Kalns | 180/446 |
| 4,629,024 | 12/1986 | Buike et al. | 180/79.1 |
| 4,765,425 | 8/1988 | Saito et al. | 180/444 |
| 5,299,650 | 4/1994 | Wada et al. | 180/446 |

*Primary Examiner*—Paul N. Dickson
*Attorney, Agent, or Firm*—Finnegan, Henderson, Farabow, Garrett & Dunner

[57] ABSTRACT

An electrically powered drive mechanism for providing powered assistance to a vehicle steering mechanism. The drive mechanism includes a clutch responsive to drivingly isolate the motor from an output shaft coupling when torque in excess of a selected level is transmitted through the clutch.

8 Claims, 5 Drawing Sheets

ELECTRICALLY POWERED STEERING MECHANISM

The present invention relates to an electrically powered drive mechanism for providing powered assistance to a vehicle steering mechanism.

According to one aspect of the present invention, there is provided an electrically powered driven mechanism for providing powered assistance to a vehicle steering mechanism having a manually rotatable member for operating the steering mechanism, the drive mechanism including a torque sensor operable to sense torque being manually applied to the rotatable member, an electrically powered drive motor drivingly connected to the rotatable member and a controller which is arranged to control the speed and direction of rotation of the drive motor in response to signals received from the torque sensor, the torque sensor including a sensor shaft adapted for connection to the rotatable member to form an extension thereof so that torque is transmitted through said sensor shaft when the rotatable member is manually rotated and a strain gauge mounted on the sensor shaft for producing a signal indicative of the amount of torque being transmitted through said shaft.

Preferably the sensor shaft is non-rotatably mounted at one axial end in a first coupling member and is non-rotatably mounted at its opposite axial end in a second coupling member, the first and second coupling members being inter-engaged to permit limited rotation therebetween so that torque under a predetermined limit is transmitted by the sensor shaft only and so that torque above said predetermined limit is transmitted through the first and second coupling members.

The first and second coupling members are preferably arranged to act as a bridge for drivingly connecting first and second portions of the rotating member to one another.

Preferably the sensor shaft is of generally rectangular cross-section throughout the majority of its length.

Preferably the strain gauge includes one or more SAW resonators secured to the sensor shaft.

Preferably the motor is drivingly connected to the rotatable member via a clutch.

Preferably the motor includes a gear box and is concentrically arranged relative to the rotatable member.

Figure 2:
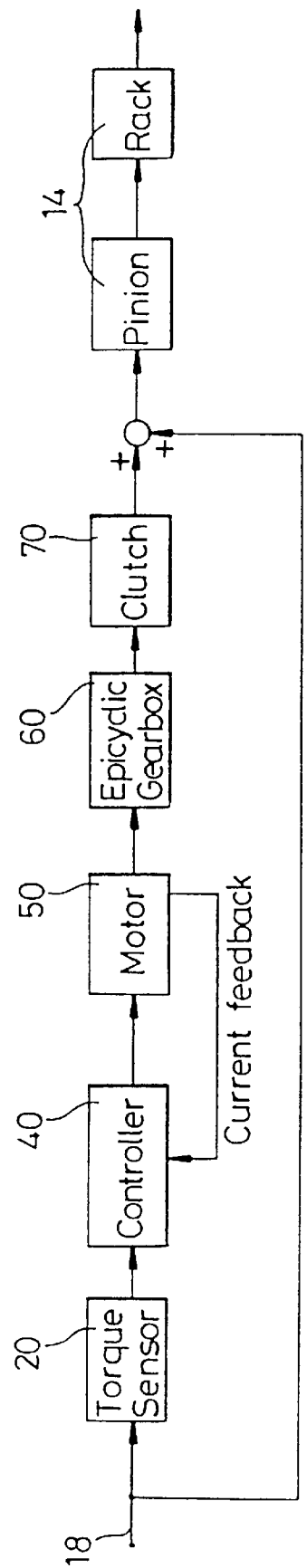
Figures 3, 4:
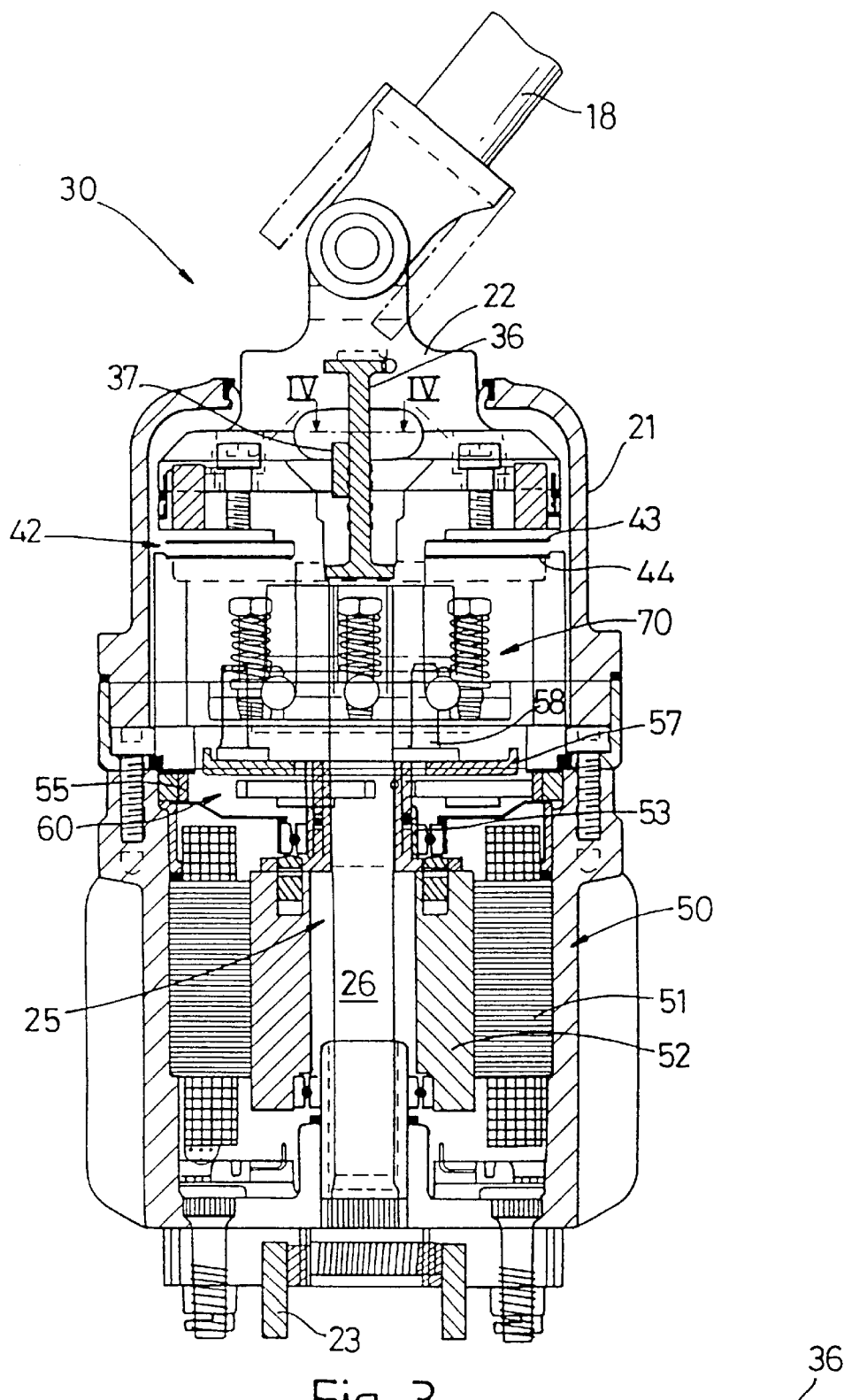
Figure 5:
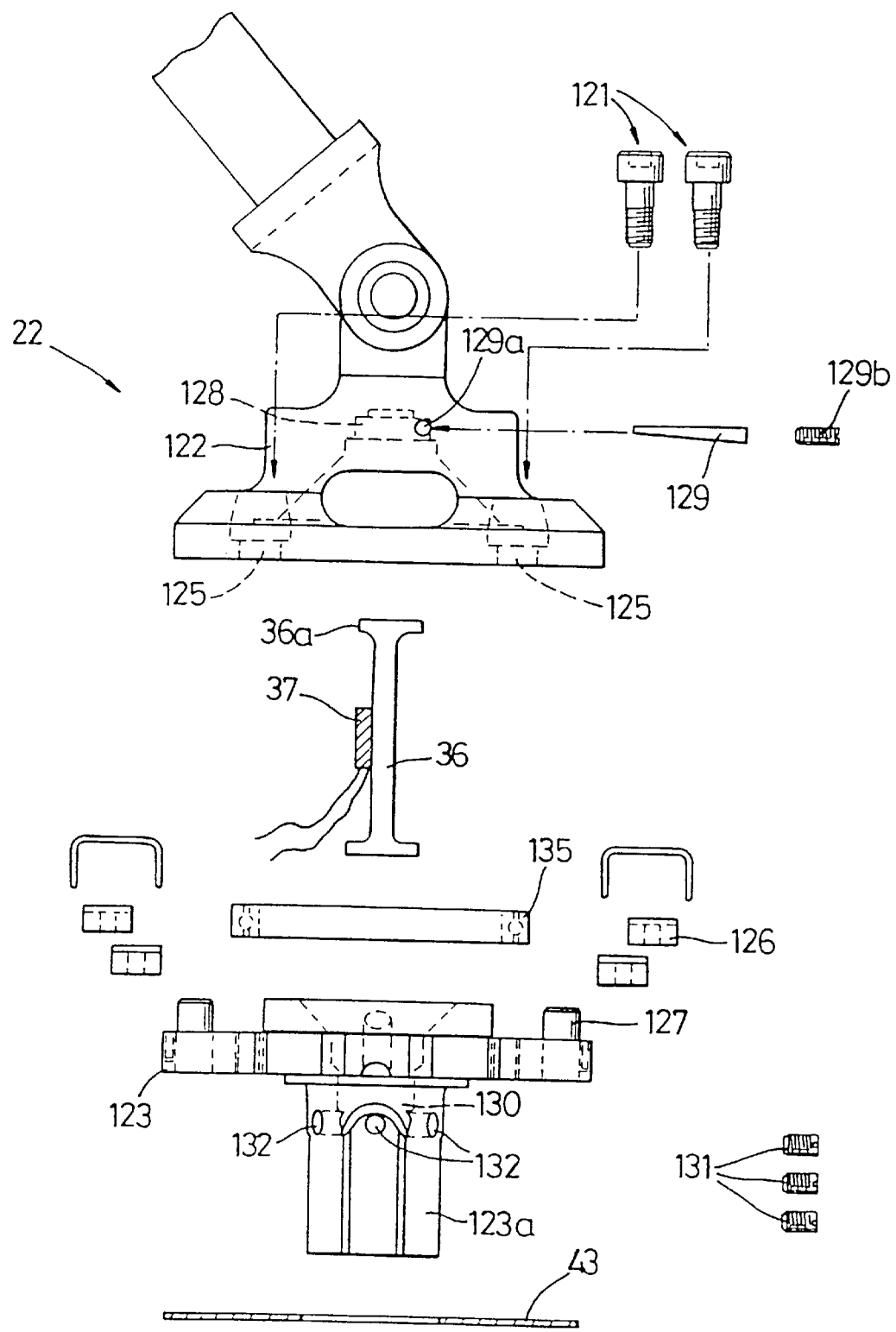
Figure 6:
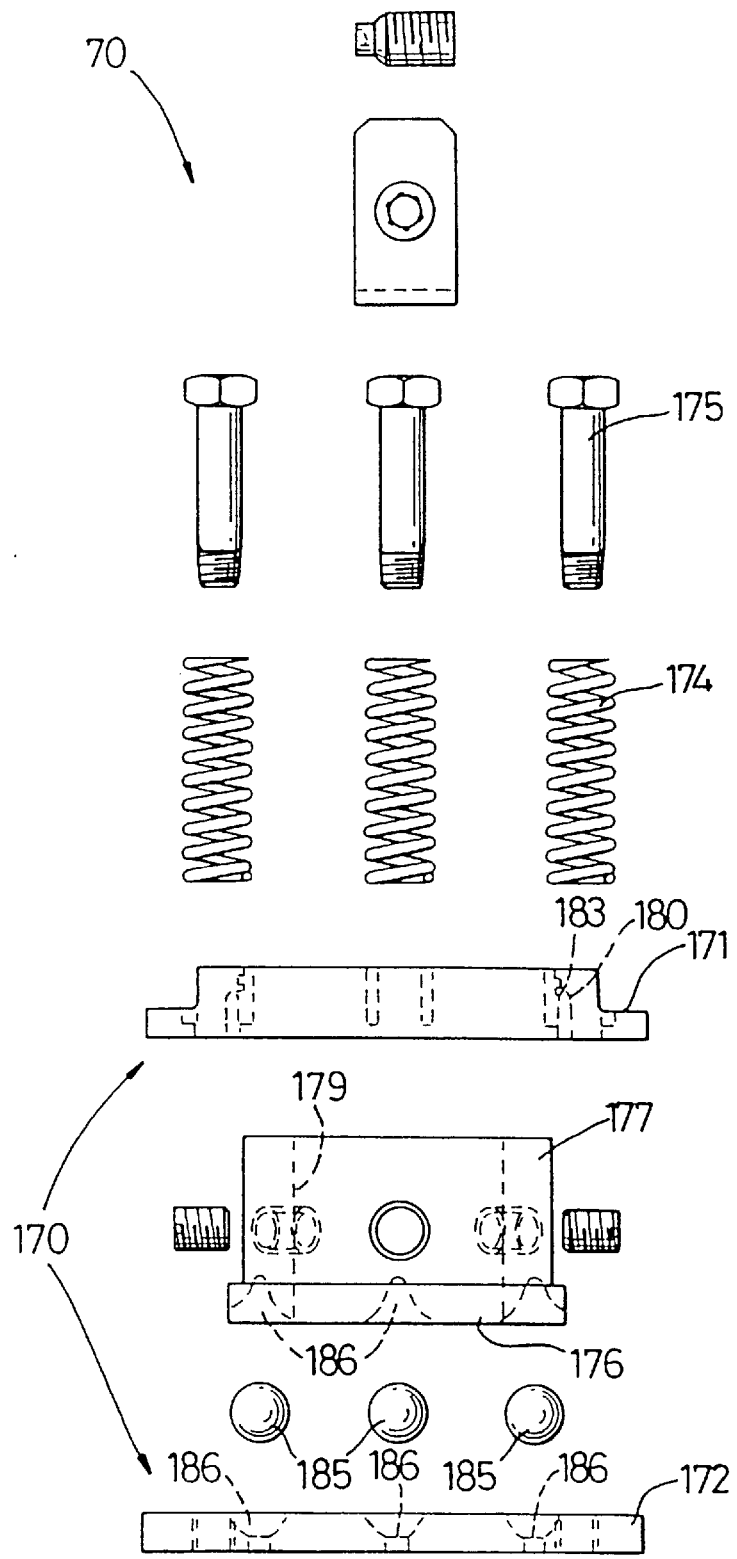

Various aspects of the present invention will hereafter be described, with reference to the accompanying drawings, in which:

FIG. 1 is a diagrammatic view of a vehicle steering mechanism including an electrically powered drive mechanism according to the present invention, FIG. 2 is a flow diagram illustrating interaction between various components of the drive mechanism shown in FIG. 1, FIG. 3 is an axial section through the drive mechanism shown in FIG. 1, FIG. 4 is a sectional view taken along lines IV—IV in FIG. 3, FIG. 5 is a more detailed exploded view of the input drives coupling shown in FIG. 3, and FIG. 6 is a more detailed exploded view of the clutch showing in FIG. 3.

Referring initially to FIG. 1, there is shown a vehicle steering mechanism 10 drivingly connected to a pair of steerable road wheels 12.

The steering mechanism 10 shown includes a rack and pinion assembly 14 connected to the road wheels 12 via joints 15. The pinion (not shown) of assembly 14 is rotatably driven by a manually rotatable member in the form of a steering column 18 which is manually rotated by a steering wheel 19.

The steering column 18 includes an electric powered drive mechanism 30 which includes an electric drive motor (not shown in FIG. 1) for driving the pinion in response to torque loadings in the steering column 18 in order to provide power assistance for the operative when rotating the steering wheel 19.

As schematically illustrated in FIG. 2, the electric powered drive mechanism includes a torque sensor 20 which measures the torque applied by the steering column 18 when driving the pinion and supplies a signal to a controller 40. The controller 40 is connected to a drive motor 50 and controls the electric current supplied to the motor 50 to control the amount of torque generated by the motor 50 and the direction of its rotation.

The motor 50 is drivingly connected to the steering column 18 preferably via a gear box 60, preferably an epicyclic gear box, and a clutch 70. The clutch 70 is preferably permanently engaged during normal operation and is operative under certain conditions to isolate drive from the motor 50 to enable the pinion to be driven manually through the drive mechanism 30. This is a safety feature to enable the mechanism to function in the event of the motor 50 attempting to drive the steering column too fast and/or in the wrong direction or in the case where the motor and/or gear box have seized.

The torque sensor 20 is preferably an assembly including a short sensor shaft on which is mounted a strain gauge capable of accurately measuring strain in the sensor shaft brought about by the application of torque within a predetermined range.

Preferably the predetermined range of torque which is measured is 0–10 Nm; more preferably is about 1–5 Nm.

Preferably the range of measured torque corresponds to about 0–1000 microstrain and the construction of the sensor shaft is chosen such that a torque of 5 Nm will result in a twist of less than 2° in the shaft, more preferably less than 1°.

Preferably the strain gauge is a SAW resonator, a suitable SAW resonator being described in WO91/13832. Preferably a configuration similar to that shown in FIG. 3 of WO91/13832 is utilised wherein two SAW resonators are arranged at 45° to the shaft axis and at 90° to one another.

Preferably the resonators operate with a resonance frequency of between 200–400 MHz and are arranged to produce a signal to the controller 40 of 1 MHz±500 KHz depending upon the direction of rotation of the sensor shaft. Thus, when the sensor shaft is not being twisted due to the absence of torque, it produces a 1 MHz signal.

When the sensor shaft is twisted in one direction it produces a signal between 1.0 to 1.5 MHz. When the sensor shaft is twisted in the opposite direction it produces a signal between 1.0 to 0.5 MHz. Thus the same sensor is able to produce a signal indicative of the degree of torque and also the direction of rotation of the sensor shaft.

Preferably the amount of torque generated by the motor in response to a measured torque of between 0–10 Nm is 0–40 Nm and for a measured torque of between 1–5 Nm is 0–25 Nm.

Preferably a feed back circuit is provided whereby the electric current being used by the motor is measured and compared by the controller 40 to ensure that the motor is running in the correct direction and providing the desired amount of power assistance. Preferably the controller acts to reduce the measured torque to zero and so controls the motor to increase its torque output to reduce the measured torque.

A vehicle speed sensor (not shown) is preferably provided which sends a signal indicative of vehicle speed to the controller. The controller uses this signal to modify the degree of power assistance provided in response to the measured torque.

Thus at low vehicle speeds maximum power assistance will be provided and a high vehicle speeds minimum power assistance will be provided.

The controller is preferably a logic sequencer having a field programmable gate array for example a XC 4005 as supplied by Xilinx. Such a controller does not rely upon software and so is able to function more reliably in a car vehicle environment. It is envisaged that a logic sequence not having a field programmable array may be used.

A specific construction of an electric power drive mechanism 10 is illustrated in FIG. 3.

The mechanism 11 includes a housing 21 of generally cylindrical form having an input shaft coupling 22 at one axial end and an output shaft coupling 23 at the opposite axial end.

A shaft assembly 25 extends between the input and output shaft couplings 22, 23, respectively, to provide a direct mechanical drive connection therebetween so that rotation of coupling 22 causes coupling 23 to rotate in unison therewith.

The shaft assembly 25 includes a main shaft 26 of round cross-section which is connected at one axial to the output coupling 23 and at its opposite axial end to a sensor shaft 36 of the torque sensor 20. As seen in FIGS. 3 and 4, the sensor shaft 36 is of generally rectangular cross-section having circular sections at each end and is in turn connected to the input coupling 22.

The shaft 36 is preferably of rectangular section as this enables shafts having the same resistance to twist to be accurately produced by mass production techniques. The shaft may be machined or cast.

The input coupling 22 is more clearly shown in FIG. 5.

The coupling 22 includes a first coupling member 122 which is secured by bolts 121 to a second coupling member 123. The bolts 121 pass through elongated slots 125 in the first coupling member 122 so that the first and second members 122, 123 can rotate relative to one another over a limited arc.

The amount of relative angular displacement between the coupling members 122, 123 is determined by stop blocks 126 mounted on dowels 127 which co-operate with a recess (not shown) formed in coupling member 122.

The coupling member 122 has a recess 128 for receiving the upper end of the sensor shaft 36.

The upper axial end of the sensor shaft has a flat 36a formed thereon and a wedge 129 is provided for positively locking the upper end of the sensor shaft in recess 128 by passing through a bore 129a. A grub screw 129b is preferably provided for insertion in bore 129a to prevent axial withdrawal of the wedge.

The lower axial end of the sensor shaft 36 is located within a recess 130 of the second coupling member 123 and is fixedly secured thereto by grub screws 131 passing through threaded bores 132 formed about the periphery of member 123. A bearing 135 is located between the coupling members 122, 123 to provide a rotary connection therebetween.

The size and shape and material used to construct sensor shaft 36 is chosen to provide a predetermined small amount of twist in the shaft when transmitting the maximum desired torque required to be input manually.

In a typical arrangement for transmitting up to 5 Nm torque, the shaft 36 is about 50 mm and the diameter of the circular end portions is about 16 mm and the cross-section dimensions of the rectangular section are about 16×5 mm. With such a shaft mode from KE805 steel the measured strain at 5 Nm torque is about 500 microstrain and the angle of twist is less than 0.3°.

The coupling members 122, 123 are arranged to permit unimpeded twist in the sensor shaft when transmitting torques below the predetermined value (typically 5 Nm) but rotatably engage to transmit torques in excess of the predetermined value. According, the sensor shaft is isolated from transmitting more than the predetermined torque value and so cannot be over strained.

The sensor shaft 36 has mounted thereon a strain gauge 37 which is arranged to determine the amount of strain in sensor shaft 36 which is caused when the input coupling 32 is rotated.

The strain gauge 37 is electrically coupled to the controller 40 (not shown in FIG. 3) via a capacitative coupling 42 defined by a pair of printed circuit boards 43, 44. The upper board 43 is connected to the input coupling member 123 to be rotated therewith and the lower board 44 is secured to the housing 21. The lower printed circuit board 44 contains a circuit for converting the 200–400 MHz signals produced by the resonators to the desired 1 MHz signal for transmission to the controller.

It will be appreciated that the gauge 37 may be coupled to the controller through alternative means of coupling, as for example an inductive coupling.

The motor 50 is preferably a brushless DC motor which is preferably a low speed, high torque, low torque ripple motor.

The motor 50 is preferably a concentric motor surrounding the main shaft 26 and has an outer stator 51 secured to the housing 21 and an inner rotor 52 which drives a sun gear 53 of an epicyclic gear box 60.

The gear box 60 has a stationary outer ring gear 55 mounted on the housing 21 so that output drive from the gear box is via the planetary gear carrier 57.

The planetary gear carrier 57 has a series of pins 58 which transmit drive to the main shaft 26 via the clutch 70.

The clutch 70 is shown in greater detail in FIG. 6.

The clutch 70 includes a drive disc assembly 170 comprising a pair of discs 171, 172 and compression springs 174 mounted on compression bolts 175 which are screw threadedly attached to disc 172. The springs 174 enable discs 171, 172 to move apart axially. The discs 171, 172 are driven by pins 58 on the gear carrier 57.

The clutch 70 further includes a driven disc 176 having a tubular extension 177.

The driven disc 176 is located within a recess 180 formed in disc 171 and is held in axial compression against disc 172 by a shoulder 183. Located between discs 176 and 172 is a series of balls 185 housed in pockets 186. Whilst balls 185 remain in pockets 186 drive is transmitted from disc 172 to disc 176. If torque in excess of a predetermined amount is transmitted between discs 172, 176, the discs are caused to separate axially and so drive therebetween is lost.

The tubular extension 177 has an internal bore 179 which receives a tubular extension 123a of coupling member 123. Tubular extensions 123a and 177 are secured to one another and main shaft 26.

Accordingly rotary drive to the main shaft 26 is provided by coupling member 123 and/or clutch 70. In the event of motor failure, clutch 70 will operate on manual rotation of column 18 to isolate the motor and so permit rotary drive to shaft 26 via the coupling member 123 only.

The above described mechanism 30 provides a compact unit including both torque sensor and motor combined into a single housing. Typically the housing 21 is about 130 mm diameter and about 210 mm long.

It is envisaged that the torque sensor 20 comprising coupling 22 in combination with the sensor shaft 36 and gauge 37 may be used as a separate assembly for incorporation into any rotating member for measuring torque being transmitted thereby. Such a sensor 20 may be used to control a separate motor which may or may not be concentric with the rotating member.

We claim:

1. An electrically powered drive mechanism for providing powered assistance to a vehicle steering mechanism having a manually rotatable member for operating the steering mechanism, the drive mechanism including a housing of generally cylindrical form having an impact shaft coupling at one axial end for driving connection with the rotatable member and an output shaft coupling at its opposite axial end for driving connection with the vehicle steering mechanism, a shaft assembly extending between the input and output shaft couplings to provide a direct mechanical drive connection therebetween so that torque is transmitted through the shaft assembly when the rotatable member is rotated, the drive mechanism including a torque sensor operable to sense torque being manually applied to the rotatable member, an electrically powered drive motor housed within said housing and being concentrically arranged relative to said shaft assembly and a controller which is arranged to control the speed and direction of rotation of the drive motor in response to signals received from the torque sensor, the torque sensor including a sensor shaft which forms part of said shaft assembly so that torque transmitted through the shaft assembly is transmitted through said sensor shaft and a strain gauge mounted on the sensor shaft for producing a signal indicative of the amount of torque being transmitted through said sensor shaft, the motor being drivingly connected to an epicyclic gear assembly housed within said housing, the epicyclic gear assembly being drivingly connected to the output shaft coupling via a normally permanently engaged clutch, the clutch being responsive to drivingly isolate the motor from the output shaft coupling when torque in excess of a predetermined value is transmitted in one of two directions through the clutch.

2. A mechanism according to claim 1 wherein the sensor shaft is non-rotatably mounted at one axial end in a first coupling member and is non-rotatably mounted at its opposite axial end in a second coupling member, the first and second coupling members being inter-engaged to permit limited rotation therebetween so that torque under a predetermined limit is transmitted by the sensor shaft only and so that torque above said predetermined limit is transmitted through the first and second coupling members.

3. A mechanism according to claim 2 wherein the first and second coupling members are arranged to act as a bridge for drivingly connecting first and second portions of the rotating member to one another.

4. A mechanism according to any preceding claim wherein the sensor shaft is of generally rectangular cross-section throughout the majority of its length.

5. A mechanism according to claim 1, wherein the sensor shaft is constructed such that a torque of 5 $N_m$ results in a twist of less than 2° about the axis of the shaft.

6. A mechanism according to claim 1, wherein the strain gauge includes one or more SAW resonators secured to the sensor shaft.

7. A mechanism according to claim 6 wherein the one or more resonators operate with a resonance frequency of between 200–400 MHz and are arranged to produce a signal to the controller of between 1.0 to 1.5 MHz when the sensor shaft is twisted in one direction and between 1.0 to 0.5 MHz when the sensor shaft is twisted in an opposite direction.

8. A vehicle steering mechanism including the electrically powered drive mechanism of claim 1.

* * * * *